(12) United States Patent
Yao

(10) Patent No.: US 12,731,344 B2
(45) Date of Patent: Sep. 8, 2026

(54) METHOD FOR GENERATING VISUAL CONTENT, HOST, AND COMPUTER READABLE STORAGE MEDIUM

(71) Applicant: HTC Corporation, Taoyuan City (TW)

(72) Inventor: Chang-Chen Yao, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 262 days.

(21) Appl. No.: 18/395,719

(22) Filed: Dec. 25, 2023

(65) Prior Publication Data

US 2025/0209748 A1 Jun. 26, 2025

(51) Int. Cl.

*G06T 19/00* (2011.01)
*G02B 27/01* (2006.01)
*G06T 17/00* (2006.01)
*G09B 9/05* (2006.01)

(52) U.S. Cl.

CPC .......... *G06T 19/006* (2013.01); *G02B 27/017* (2013.01); *G06T 17/00* (2013.01); *G06T 19/003* (2013.01); *G09B 9/05* (2013.01)

(58) Field of Classification Search

None
See application file for complete search history.

(56) References Cited

U.S. PATENT DOCUMENTS

| | | | | |
|---|---|---|---|---|
| 10,482,669 | B2 * | 11/2019 | Rober | B60K 35/26 |
| 2019/0121522 | A1 * | 4/2019 | Davis | G06V 40/28 |
| 2023/0004801 | A1 | 1/2023 | Farabet et al. | |

FOREIGN PATENT DOCUMENTS

| | | |
|---|---|---|
| CN | 108734443 | 11/2018 |
| TW | 202113549 | 4/2021 |
| TW | 202333494 | 8/2023 |

OTHER PUBLICATIONS

"Office Action of Taiwan Counterpart Application", issued on Dec. 31, 2024, p. 1-p. 16.

* cited by examiner

*Primary Examiner* — Robert J Craddock
(74) *Attorney, Agent, or Firm* — JCIPRNET

(57) ABSTRACT

The embodiments of the disclosure provide a method for generating a visual content, a host, and a computer readable storage medium. The method includes: in response to determining that the host has connected with a built-in computer of an accommodating space, loading a 3D model associated with the accommodating space, wherein the 3D model at least partially corresponds to a physical structure of the accommodating space; determining a host position of the host within the 3D model and accordingly determining an object position of a predetermined object in the 3D model; and generating the visual content via combining a virtual object with the predetermined object.

18 Claims, 4 Drawing Sheets

520
530
500a
599
510
500

METHOD FOR GENERATING VISUAL CONTENT, HOST, AND COMPUTER READABLE STORAGE MEDIUM

BACKGROUND

1. Field of the Invention

The present disclosure generally relates to a mechanism for providing a reality service, in particular, to a method for generating a visual content, a host, and a computer readable storage medium.

2. Description of Related Art

Simulated driving, while offering a relatively safe and cost-effective training environment, comes with its own set of limitations. One significant drawback is the inherent challenge of replicating the realism of the actual driving experience. Simulators often fall short in fully mimicking the sensory aspects of real-world driving, such as authentic visuals, sounds, and physiological responses. This can leave drivers feeling less prepared when confronted with the diverse pressures and scenarios encountered on genuine roads.

Additionally, the technological costs associated with high-quality driving simulators, involving expensive hardware and software, pose a barrier to accessibility for some organizations and individuals.

In view of the fact that the technology of reality services has been advancing day by day, it would be quite beneficial if those skilled in the art could realize simulated driving by designing reality services.

SUMMARY OF THE INVENTION

Accordingly, the disclosure is directed to a method for generating a visual content, a host, and a computer readable storage medium, which may be used to solve the above technical problems.

The embodiments of the disclosure provide a method for generating a visual content, applied to a host. The method includes: in response to determining that the host has connected with a built-in computer of an accommodating space, loading, by the host, a 3D model associated with the accommodating space, wherein the 3D model at least partially corresponds to a physical structure of the accommodating space; determining, by the host, a host position of the host within the 3D model and accordingly determining, by the host, an object position of a predetermined object in the 3D model; and generating the visual content via combining a virtual object with the predetermined object.

The embodiments of the disclosure provide a host including a storage circuit and a processor. The storage circuit stores a program code. The processor is coupled to the storage circuit and accesses the program code to perform: in response to determining that the host has connected with a built-in computer of an accommodating space, loading a 3D model associated with the accommodating space, wherein the 3D model at least partially corresponds to a physical structure of the accommodating space; determining a host position of the host within the 3D model and accordingly determining an object position of a predetermined object in the 3D model; and generating a visual content via combining a virtual object with the predetermined object.

The embodiments of the disclosure provide a computer readable storage medium, the computer readable storage medium recording an executable computer program, the executable computer program being loaded by a host to perform steps of: in response to determining that the host has connected with a built-in computer of an accommodating space, loading a 3D model associated with the accommodating space, wherein the 3D model at least partially corresponds to a physical structure of the accommodating space; determining a host position of the host within the 3D model and accordingly determining an object position of a predetermined object in the 3D model; and generating a visual content via combining a virtual object with the predetermined object.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
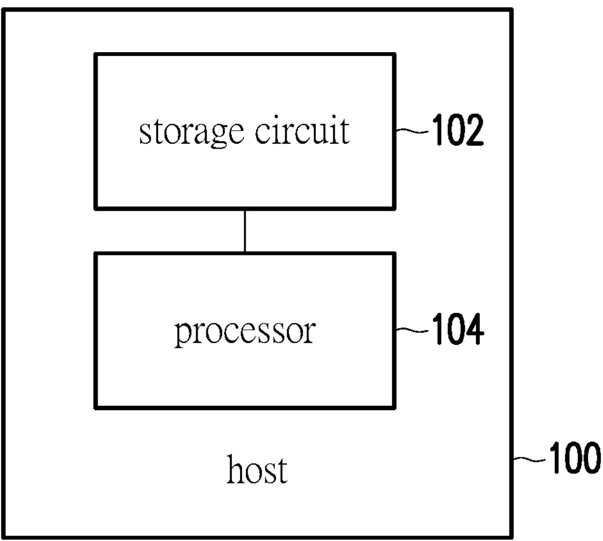
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In various embodiments, the host 100 can be any smart device and/or computer device that can provide visual contents of reality services such as virtual reality (VR) service, augmented reality (AR) services, mixed reality (MR) services, and/or extended reality (XR) services, but the disclosure is not limited thereto. In some embodiments, the host 100 can be a head-mounted display (HMD) capable of showing/providing visual contents (e.g., AR/VR/MR contents) for the wearer/user to see. For better understanding the concept of the disclosure, the host 100 would be assumed to be an MR device (e.g., a MR HMD) for providing MR contents for the user to see, but the disclosure is not limited thereto.

In the embodiments where the visual content is the MR content, the MR content may include a pass-through image and at least one rendered virtual object overlaying on the pass-through image. In this case, the pass-through image is used as an underlying image of the visual content.

In one embodiment, the pass-through image may be rendered by, for example, the GPU of the host 100 based on the image captured by, for example, the front camera of the host 100. In this case, the user wearing the host 100 (e.g., the HMD) can see the real-world scene in front of the user via the pass-through image in the visual content provided by the host 100.

In one embodiment, the GPU may render one or more virtual object based on the MR application currently running on the host 100, and the processor 104 can overlay the rendered virtual object on the rendered pass-through image to form/generate the visual content (e.g., the MR content).

In one embodiment, the host 100 can be disposed with built-in displays for showing the visual contents for the user to see. Additionally or alternatively, the host 100 may be connected with one or more external displays, and the host 100 may transmit the visual contents to the external display(s) for the external display(s) to display the visual contents, but the disclosure is not limited thereto.

In FIG. 1, the storage circuit 102 is one or a combination of a stationary or mobile random access memory (RAM), read-only memory (ROM), flash memory, hard disk, or any other similar device, and which records a plurality of modules and/or a program code that can be executed by the processor 104.

The processor 104 may be coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 may access the modules and/or the program code stored in the storage circuit 102 to implement the method for generating a visual content provided in the disclosure, which would be further discussed in the following.

Figure 2:
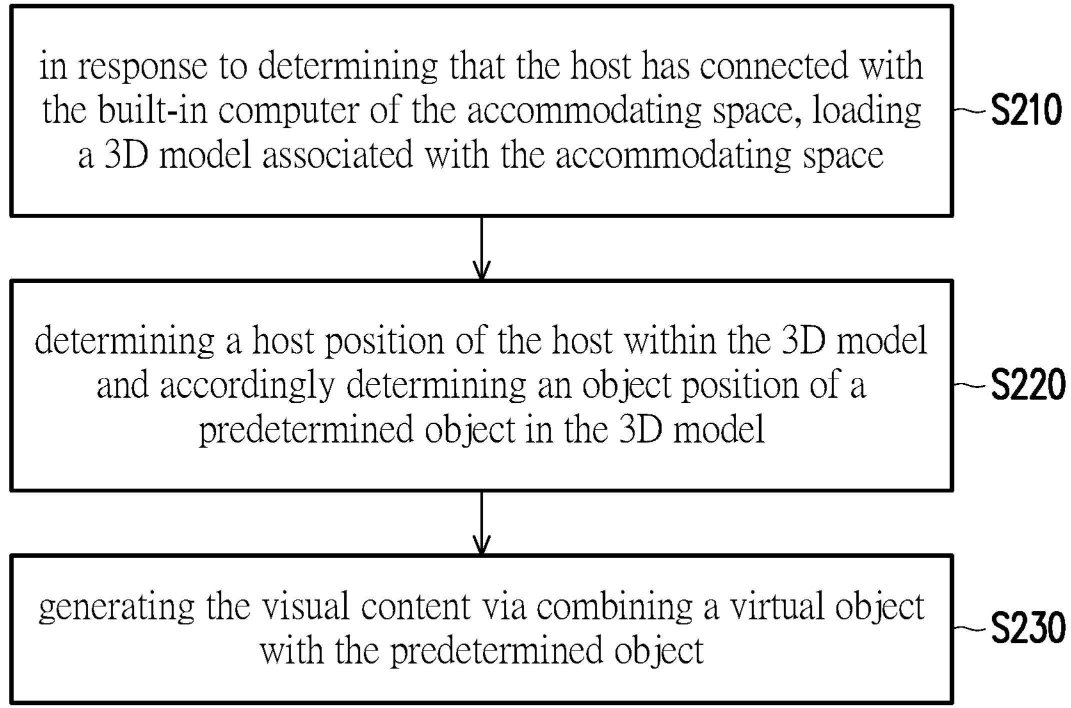
FIG. 2 shows a flow chart of the method for generating a visual content according to an embodiment of the disclosure.

See FIG. 2, which shows a flow chart of the method for generating a visual content according to an embodiment of the disclosure. The method of this embodiment may be executed by the host 100 in FIG. 1, and the details of each step in FIG. 2 will be described below with the components shown in FIG. 1.

In one embodiment, the processor 104 may determine whether the host 100 has connected with a built-in computer of an accommodating space. In various embodiments, the accommodating space can be any kind of space designed with a corresponding computer. For example, the accommodating space can be a room, a gallery, a classroom, a museum, an office, and/or a vehicle.

For better understanding the concept of the disclosure, the accommodating space considered in the following discussions would be assumed to be a vehicle (e.g., a car, a plane, a ship, etc.), but the disclosure is not limited thereto.

In the embodiments where the accommodating space is assumed to be a vehicle, the corresponding built-in computer can be the on-board computer of the vehicle, but the disclosure is not limited thereto.

In one embodiment, the built-in computer can be disposed with wired/wireless communication circuits, and the host 100 may attempt to connect with the wired/wireless communication circuits of the built-in computer via the corresponding communication interfaces (e.g., Bluetooth, Wi-fi, cable, etc.).

In step S210, in response to determining that the host 100 has connected with the built-in computer of the accommodating space, the processor 104 loads a 3D model associated with the accommodating space, wherein the 3D model at least partially corresponds to a physical structure of the accommodating space.

For example, if the accommodating space is a car, the 3D model may be the 3D model of at least a part of the car, which may include the 3D objects/structures of the car body, windows, seats, dashboard, steering wheel, brake, gear stick, pedal (e.g., a gas pedal), and/or clutch, but the disclosure is not limited thereto.

For another example, if the accommodating space is a plane, the 3D model may be the 3D model of at least a part of the plane, which may include the 3D models/objects/structures of the plane body, windows, seats, dashboard, and/or control sticks, but the disclosure is not limited thereto.

In one embodiment, the 3D model can be prestored in the built-in computer of the accommodating space, and the processor 104 may request the built-in computer to provide the 3D model after connecting to the built-in computer.

In one embodiment, the processor 104 can further obtain other information associated with the accommodating space from the built-in computer, such as the materials of the sizes/materials/dimensions of the above-mentioned 3D objects/structures. In the embodiments where the accommodating space is a vehicle disposed with one or more controlling portion (e.g., the steering wheel, brake, control stick, pedal, gear stick, clutch, etc.), the processor 104 can also request the built-in computer to provide a real-time status of each of the controlling portion on the vehicle, but the disclosure is not limited thereto. For example, the real-time status of the steering wheel may be how many angles has the steering wheel been rotated; the real-time status of the gear stick may be the gear currently indicated by the gear stick; the real-time status of the brake/pedal may be the depth of the brake/pedal currently being pressed, but the disclosure is not limited thereto.

In one embodiment, the accommodating space may be configured with at least one predetermined position, and the manufacture of the accommodating space may pre-establish a 3D map corresponding to each of predetermined position. For example, if the accommodating space is a vehicle, the corresponding predetermined position may be the seat therein. In this case, the engineer of the vehicle may use a 3D map acquiring device (e.g., another HMD with the capability of performing environment scanning algorithms) to establish the 3D map corresponding to each seat while sitting at each seat.

In one embodiment, the processor 104 may provide/show a position selection interface showing each predetermined position, and the user/wear may select the required position/seat therefrom. In one embodiment, in response to determining that a certain predetermined position (referred to as a first predetermined position) among the at least one predetermined position has been selected in the position selection interface, the processor 104 may obtain, from the built-in computer, a first 3D map corresponding to the first predetermined position as the 3D model associated with the accommodating space in step S210, but the disclosure is not limited thereto.

For example, if the user sits in the driver seat of the vehicle, the user may select the driver seat as the first predetermined position from the position selection window, and the processor 104 may accordingly request the built-in computer to provide the 3D map corresponding to the driver seat as the 3D model considered in step S210, but the disclosure is not limited thereto.

In step S220, the processor 104 determines a host position of the host 100 within the 3D model and accordingly determine an object position of a predetermined object in the 3D model.

In some embodiments, the processor 104 may determine the host position via performing an inside-out mechanism (e.g., the Simultaneous localization and mapping (SLAM)

mechanism) and/or an outside-in mechanism. In one embodiment, after obtaining the first 3D map in the above, the processor 104 may determine the position of the host 100 in the first 3D map as the host position, but the disclosure is not limited thereto.

As mentioned in the above, the 3D model may include some 3D objects/structures corresponding to the physical structure of the accommodating space, and the predetermined object may be some specific object/structure among the 3D objects/structures that the processor 104 can overlay thereon.

In some embodiments, the predetermined object may include a transparent object and/or an opaque object in the 3D model of the accommodating space. In the embodiments where the accommodating space is a vehicle, the considered transparent object may be the 3D object/structure corresponding to one or more of the windows (including the windshield) of the vehicle, and the opaque object may be the 3D object/structure corresponding anything on the vehicle that may block the vision of the user, such as the pillars disposed in the vehicle, but the disclosure is not limited thereto.

In one embodiment, since the predetermined object is a part of the 3D model of the accommodating space, the object position thereof can be regarded as known once the 3D model of the accommodating space has been obtained, but the disclosure is not limited thereto.

In step S230, the processor 104 generates the visual content (e.g., the MR content) via combining a virtual object with the predetermined object. In one embodiment, the processor 104 may overlay the virtual object onto the predetermined object to generate the visual content.

Figure 3:
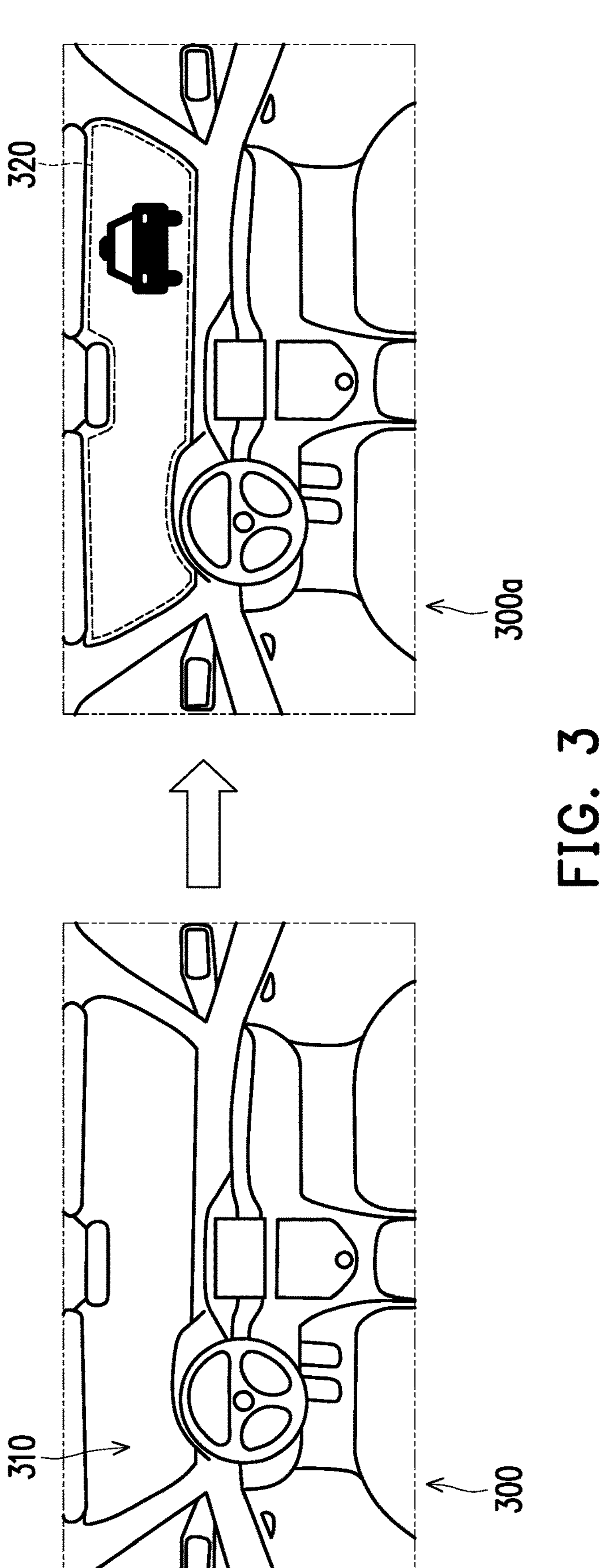
FIG. 3 shows an application scenario according to a first embodiment of the disclosure.
Figure 4:
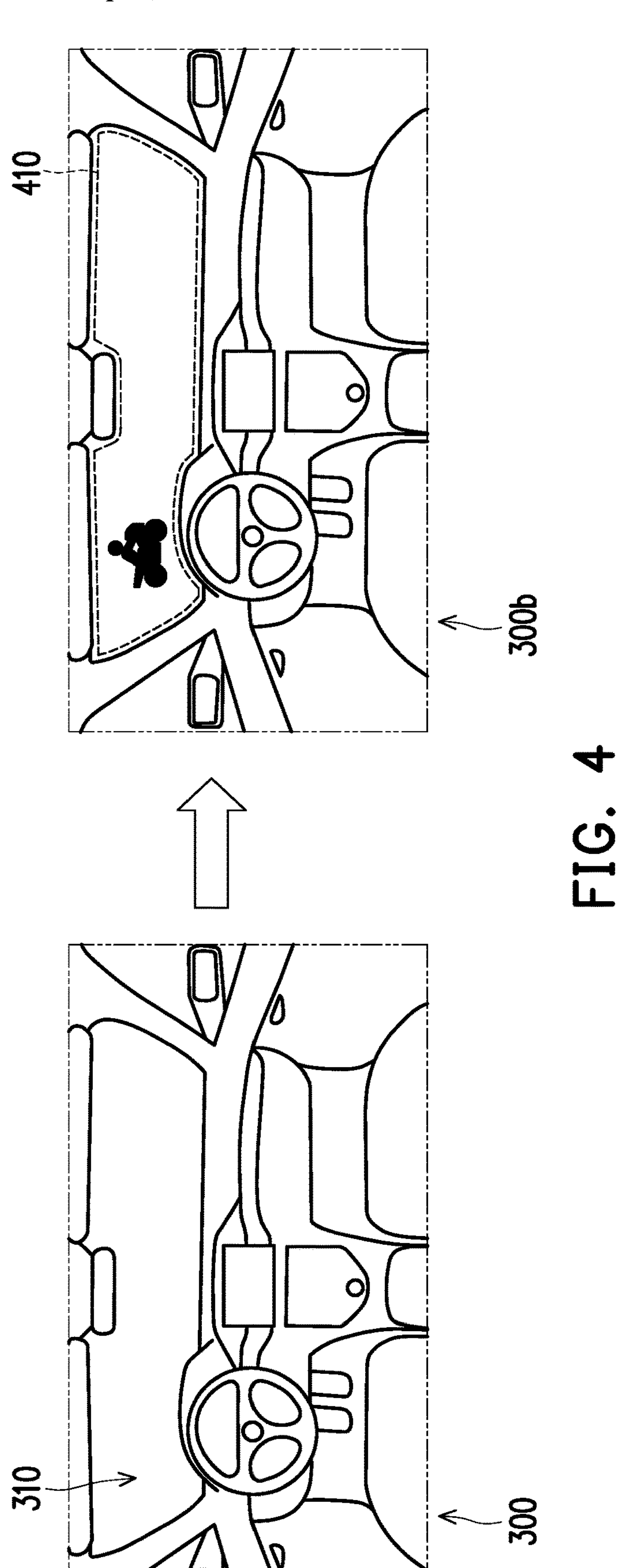
FIG. 4 shows an application scenario according to a second embodiment of the disclosure.
Figure 5:
FIG. 5 shows an application scenario according to a third embodiment of the disclosure.
Figure 5:
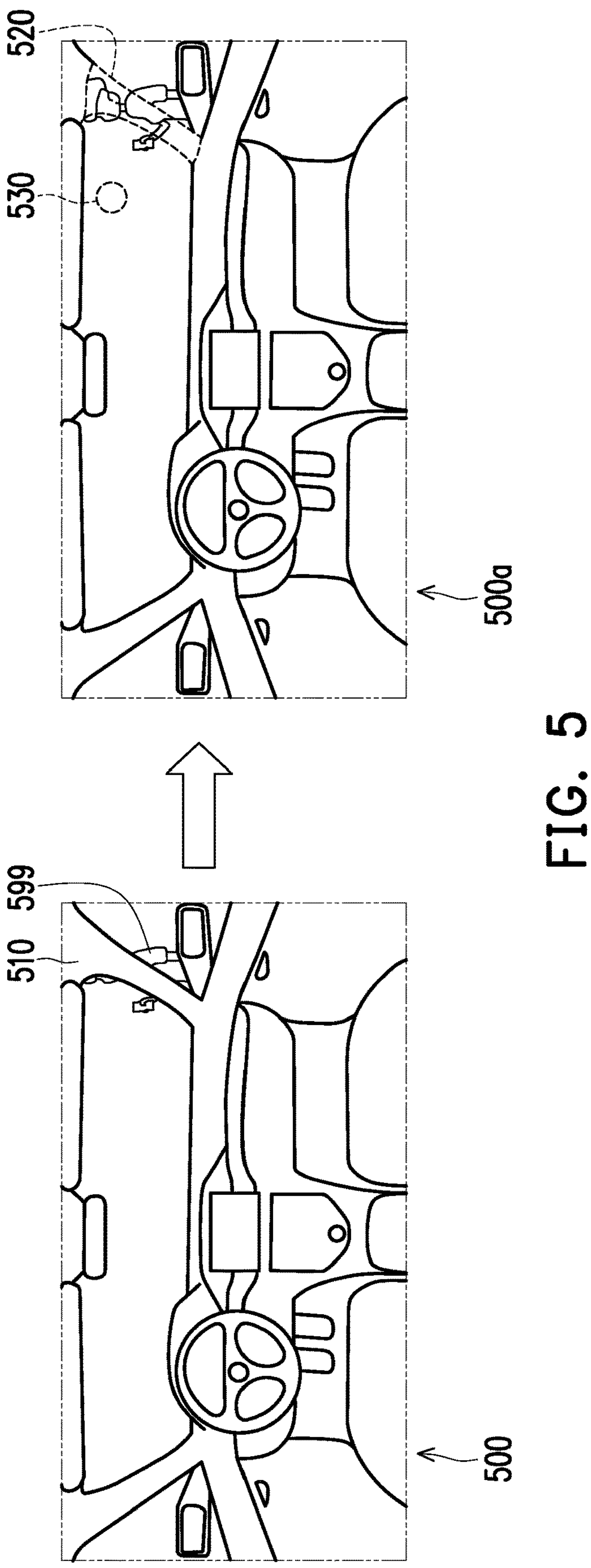

For better understanding the concept of the disclosure, FIGS. 3 to 5 would be provided as examples, but the disclosure is not limited thereto.

See FIG. 3, which shows an application scenario according to a first embodiment of the disclosure. In the first embodiment, the accommodating space is assumed to be the vehicle shown in FIG. 3. In the embodiment, the user may wear the host 100 (e.g., the HMD) and sit within the vehicle, and the processor 104 may render a pass-through image based on the images captured by the front camera of the host 100 and provide the pass-through image as a part (e.g., background) of the visual content 300.

In the first embodiment, the processor 104 may obtain the 3D model of the vehicle after connecting with the built-in computer (e.g., the on-board computer) of the vehicle. With the 3D model of the vehicle, the processor 104 may determine the host position of the host 100 in the 3D model and the object position of the predetermined object 310. In FIG. 3, the predetermined object 310 may be a transparent object such as the windshield.

In the first embodiment, the vehicle may be disposed with cameras for capturing real-time images around the vehicle, and the built-in computer may provide the captured images to the host 100 as real-time view(s).

In one embodiment, the vehicle may be disposed with a rear camera for capturing images behind the vehicle. In this case, the built-in computer may provide the images captured by the rear camera of the vehicle to the host 100 as the real-time view (i.e., a real-time rear view).

In this case, the processor 104 may receive, from the built-in computer, the real-time view detected by the vehicle, and render the view object 320 (i.e., a real-time rear view object) based on the real-time view detected by the vehicle, wherein the view object 320 may be the virtual object to be overlaid onto the predetermined object 310, but the disclosure is not limited thereto.

After rendering the view object 320, the processor 104 may overlay the view object 320 onto the predetermined object 310 to generate the visual content 300*a* in FIG. 3.

In one embodiment, the size/shape/dimensions of the view object 320 can be designed to be corresponding to the size/shape/dimensions of the predetermined object 310.

In FIG. 3, since the predetermined object 310 corresponds to the windshield of the vehicle, the view object 320 can be understood as being overlaid onto the windshield of the vehicle in the visual content 300*a*.

In one embodiment, since the 3D model is known to the processor 104, the processor 104 can determine the relative position/size/dimension of the predetermined object 310 based on the host position, which allows the processor 104 to properly determine the size/shape/dimensions of the view object 320 and accordingly overlay the rendered view object 320 onto the predetermined object 310, but the disclosure is not limited thereto.

In FIG. 3, since the view object 320 shows the images at the rear of the vehicle, the visual content 300*a* may assist the user to move the car backwards. In the embodiment, the view object 320 may show a car behind the vehicle, but the disclosure is not limited thereto.

In one embodiment, the processor 104 may show the visual content 300*a* in response to determining that the real-time status of the gear stick of the vehicle is at the revere gear, but the disclosure is not limited thereto.

In other embodiments, if the gear stick is determined to be, for example, the drive gear, the processor 104 can request the built-in computer to provide images captured by the front camera of the vehicle as the real-time view (i.e., a real-time front view) detected by the vehicle and accordingly render the corresponding view object (i.e., a real-time front view object) for the user to see in the visual content, but the disclosure is not limited thereto.

In one embodiment, the processor 104 can also request the built-in computer to provide images captured by the side camera of the vehicle as the real-time view (i.e., a real-time side view) detected by the vehicle and accordingly render the corresponding view object (i.e., a real-time side view object) for the user to see in the visual content, but the disclosure is not limited thereto.

Therefore, the host 100 can provide driving assistance to the user via properly showing the view objects in the visual content.

See FIG. 4, which shows an application scenario according to a second embodiment of the disclosure. In FIG. 4, the processor 104 may provide the visual content 300 as in FIG. 3.

In the second embodiment, the processor 104 may execute a driving simulating application to provide the MR service of the host 100. In this case, the processor 104 may determining a virtual real-time view via executing the driving simulating application on the host 100, and render the view object 410 based on the virtual real-time view. Next, the processor 104 may overlay the view object 410 onto the predetermined object 310 to generate the visual content 300*b* in FIG. 4.

That is, the view object 410 does not reflect the real environment where the vehicle locates, but just a virtual scene created by the driving simulating application.

In addition, the processor 104 may adjust the view object 410 based on the real-time status of the controlling portion on the vehicle. For example, if the processor 104 determines that gas pedal of the vehicle is being pressed, the processor 104 may adjust the view object 410 to show a scene that looks like the vehicle is moving forward. For another example, if the processor 104 determines that the steering wheel of the vehicle is being turned left, the processor 104 may adjust the view object 410 to show a scene that looks like the vehicle is turning left, but the disclosure is not limited thereto.

That is, when the user wearing the HMD sits in the vehicle, the HMD may provide the MR content where the view object 410 is overlaid onto the windshield of the vehicle, and the view object 410 may be adjusted in response to the real-time status of the controlling portion of the vehicle, even if the vehicle is not actually moved.

Therefore, the host 100 can provide a driving simulation environment for the user to practice, which forms a novel way of realizing simulated driving.

See FIG. 5, which shows an application scenario according to a third embodiment of the disclosure. In the third embodiment, the accommodating space is assumed to be the vehicle shown in FIG. 5. In the embodiment, the user may wear the host 100 (e.g., the HMD) and sit within the vehicle, and the processor 104 may render a pass-through image based on the images captured by the front camera of the host 100 and provide the pass-through image as a part (e.g., background) of the visual content 500.

In the first embodiment, the processor 104 may obtain the 3D model of the vehicle after connecting with the built-in computer (e.g., the on-board computer) of the vehicle. With the 3D model of the vehicle, the processor 104 may determine the host position of the host 100 in the 3D model and the object position of the predetermined object 510. In FIG. 5, the predetermined object 510 may be an opaque object such as the right A-pillar of the vehicle.

In the third embodiment, the vehicle may be disposed with a front camera for capturing images in front of the vehicle. In this case, the built-in computer may provide the images captured by the front camera of the vehicle to the host 100 as the real-time view (i.e., a real-time front view).

In FIG. 5, it is assumed that there is an obstacle 599 (e.g., a pedestrian) in front of the vehicle. In this case, the processor 104 may receive, from the built-in computer, the real-time view detected by the vehicle, crop the image region corresponding to the predetermined object 510, and accordingly render the view object 520, wherein the view object 520 may be the virtual object to be overlaid onto the predetermined object 510, but the disclosure is not limited thereto. After rendering the view object 520, the processor 104 may overlay the view object 520 onto the predetermined object 510 to generate the visual content 500*a* in FIG. 5.

In one embodiment, the size/shape/dimensions of the view object 520 can be designed to be corresponding to the size/shape/dimensions of the predetermined object 510.

In FIG. 5, since the predetermined object 510 corresponds to the right A-pillar of the vehicle, the view object 520 can be understood as being overlaid onto the right A-pillar of the vehicle in the visual content 500*a*.

In one embodiment, since the 3D model is known to the processor 104, the processor 104 can determine the relative position/size/dimension of the predetermined object 510 based on the host position, which allows the processor 104 to properly determine the size/shape/dimensions of the view object 520 and accordingly overlay the rendered view object 520 onto the predetermined object 510, but the disclosure is not limited thereto.

As can be seen from FIG. 5, the obstacle 599 originally blocked by the right A-pillar become visible in the visual content 500*a*, which shows that the user can have less blind spot while driving the vehicle.

In one embodiment, the vehicle can further detect the obstacle status of the obstacle 599 after capturing the associated real-time view, such as the distance between the obstacle 599 and the vehicle. In this case, the processor 104 can receive, from the built-in computer, the obstacle status of the obstacle 599 detected by the vehicle within the real-time view and provide, based on the obstacle status, a status indicator 530 associated with the obstacle 599 in the visual content 500*a*.

In one embodiment, the processor 104 may adjust the color/size/shape of the status indicator 530 in response to the obstacle status. For example, if the processor 104 determines that the distance between the obstacle 599 and the vehicle is larger than a first distance threshold, the processor 104 may determine the color of the status indicator 530 to be a first color (e.g., green). For another example, if the processor 104 determines that the distance between the obstacle 599 and the vehicle is between the first distance threshold and a second distance threshold (which is lower than the first distance threshold), the processor 104 may determine the color of the status indicator 530 to be a second color (e.g., yellow). For yet another example, if the processor 104 determines that the distance between the obstacle 599 and the vehicle is lower than the second distance threshold, the processor 104 may determine the color of the status indicator 530 to be a third color (e.g., red).

Therefore, the user can be aware of the obstacle status of the obstacle 599 according to the status indicator 530, but the disclosure is not limited thereto.

The disclosure further provides a computer readable storage medium for executing the method for generating a visual content. The computer readable storage medium is composed of a plurality of program instructions (for example, a setting program instruction and a deployment program instruction) embodied therein. These program instructions can be loaded into the host 100 and executed by the same to execute the method for generating a visual content and the functions of the host 100 described above.

In summary, the embodiments of the disclosure provide a solution where the host can generate the visual content (e.g., MR content) by combining the rendered virtual object with the 3D model corresponding to the physical structure of the accommodating space after connecting with the built-in computer associated with the accommodating space.

In different embodiments, the generated visual content can provide assistance to the user and/or used as simulated scene, which provides a novel way for the user to experience the reality service.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for generating a visual content, applied to a head-mounted display, comprising:

in response to determining that the head-mounted display has connected with a built-in computer of an accommodating space and the head-mounted display has requested the built-in computer to provide a 3D model prestored in the built-in computer and associated with the accommodating space, loading, by the head-mounted display, the 3D model associated with the accommodating space, wherein the 3D model at least partially corresponds to a physical structure of the accommodating space, the accommodating space is a vehicle, and the built-in computer is an on-board computer of the vehicle;

determining, by the head-mounted display, a head-mounted display position of the head-mounted display within the 3D model and accordingly determining, by the head-mounted display, an object position of a predetermined object in the 3D model; and generating the visual content via combining a virtual object with the predetermined object.

2. The method according to claim 1, wherein the accommodating space comprises at least one predetermined position, and the step of loading the 3D model associated with the accommodating space comprises:

providing a position selection interface, wherein the position selection interface shows the at least one predetermined position; and in response to determining that a first predetermined position among the at least one predetermined position has been selected in the position selection interface, obtaining, from the built-in computer, a first 3D map corresponding to the first predetermined position as the 3D model associated with the accommodating space.

3. The method according to claim 1, wherein the step of combining the virtual object with the predetermined object comprises:

overlaying the virtual object onto the predetermined object.

4. The method according to claim 1, wherein the head-mounted display provides a mixed reality service, and the visual content is a mixed reality content.

5. The method according to claim 1, wherein the predetermined object comprises at least one of a transparent object of the vehicle and an opaque object of the vehicle, and the virtual object comprises a view object.

6. The method according to claim 5, further comprising:

receiving, from the built-in computer, a real-time view detected by the vehicle; and rendering the view object based on the real-time view detected by the vehicle.

7. The method according to claim 6, wherein the view object comprises at least one of a front view object, a rear view object, and a side view object, and the real-time view comprises at least one of a real-time front view, a real-time rear view, and a real-time side view.

8. The method according to claim 6, further comprising:

receiving, from the built-in computer, an obstacle status of an obstacle detected by the vehicle within the real-time view; and providing, based on the obstacle status, a status indicator associated with the obstacle in the visual content.

9. The method according to claim 5, further comprising:

determining a virtual real-time view via executing a driving simulating application on the head-mounted display; and rendering the view object based on the virtual real-time view.

10. The method according to claim 9, further comprising:

receiving, from the built-in computer, a real-time status of at least one controlling portion on the vehicle and accordingly adjusting the view object.

11. A head-mounted display, comprising:

a non-transitory storage circuit, storing a program code; and a processor, coupled to the non-transitory storage circuit and accessing the program code to perform:

in response to determining that the head-mounted display has connected with a built-in computer of an accommodating space and the head-mounted display has requested the built-in computer to provide a 3D model prestored in the built-in computer and associated with the accommodating space, loading a 3D model associated with the accommodating space, wherein the 3D model at least partially corresponds to a physical structure of the accommodating space, the accommodating space is a vehicle, and the built-in computer is an on-board computer of the vehicle;

determining a head-mounted display position of the head-mounted display within the 3D model and accordingly determining an object position of a predetermined object in the 3D model; and generating a visual content via combining a virtual object with the predetermined object.

12. The head-mounted display according to claim 11, wherein the accommodating space comprises at least one predetermined position, and the processor performs:

providing a position selection interface, wherein the position selection interface shows the at least one predetermined position; and in response to determining that a first predetermined position among the at least one predetermined position has been selected in the position selection interface, obtaining, from the built-in computer, a first 3D map corresponding to the first predetermined position as the 3D model associated with the accommodating space.

13. The head-mounted display according to claim 11, wherein the processor performs:

overlaying the virtual object onto the predetermined object.

14. The head-mounted display according to claim 11, wherein the predetermined object comprises at least one of a transparent object of the vehicle and an opaque object of the vehicle, and the virtual object comprises a view object.

15. The head-mounted display according to claim 14, wherein the processor further performs:

receiving, from the built-in computer, a real-time view detected by the vehicle; and rendering the view object based on the real-time view detected by the vehicle.

16. The head-mounted display according to claim 14, wherein the processor further performs:

determining a virtual real-time view via executing a driving simulating application on the head-mounted display; and rendering the view object based on the virtual real-time view.

17. The head-mounted display according to claim 16, wherein the processor further performs:

receiving, from the built-in computer, a real-time status of at least one controlling portion on the vehicle and accordingly adjusting the view object.

18. A non-transitory computer readable storage medium, the computer readable storage medium recording an executable computer program, the executable computer program being loaded by a head-mounted display to perform steps of:

in response to determining that the head-mounted display has connected with a built-in computer of an accommodating space and the head-mounted display has requested the built-in computer to provide a 3D model prestored in the built-in computer and associated with the accommodating space, loading a 3D model associated with the accommodating space, wherein the 3D model at least partially corresponds to a physical structure of the accommodating space, the accommodating space is a vehicle, and the built-in computer is an on-board computer of the vehicle;

determining a head-mounted display position of the head-mounted display within the 3D model and accordingly determining an object position of a predetermined object in the 3D model; and generating a visual content via combining a virtual object with the predetermined object.

* * * * *